United States Patent [19]

Torgrim

[11] 3,894,246

[45] July 8, 1975

[54] CLOCK RECOVERING APPARATUS AND METHOD

[75] Inventor: Willard J. Torgrim, Springville, Iowa

[73] Assignee: Rockwell International Corporation, El Segundo, Calif.

[22] Filed: June 24, 1974

[21] Appl. No.: 482,395

[52] U.S. Cl. .................. 307/208; 307/269; 328/63; 328/72; 328/155; 178/69.5 R

[51] Int. Cl.$^2$. H03K 19/08; H03K 1/17; H04K 7/00

[58] Field of Search ........ 307/208, 269; 328/63, 72, 328/155; 178/69.5 R

[56] References Cited

UNITED STATES PATENTS 3,363,183 1/1968 Bowling et al. ...................... 328/63

3,440,547 4/1969 Houcke ............................... 328/63

*Primary Examiner*—Stanley D. Miller, Jr.

*Attorney, Agent, or Firm*—Bruce C. Lutz

[57] ABSTRACT

A circuit for generating a clock based on time of receipt of a RZ (return to zero) data bit stream using a known clocking frequency. An internal actuated counter is used to generate a lower frequency data clock and is reset to an initial condition whenever the incoming data phase deviates mote than a prescribed amount from the phase of the generated clock. A non-zero data pattern is required to periodically resynchronize the derived clock with the incoming data.

4 Claims, 2 Drawing Figures

CLOCK RECOVERING APPARATUS AND METHOD

THE INVENTION

The present inventive concept relates to electronic circuits and more specifically to a means for recovering clock information from the incoming data.

The prior art has utilized various phase-lock techniques or ringing circuits to recover the clock information from the incoming data. This prior art, in general, was analog circuitry and oftentimes required critical adjustments or critical parts and noise pulses interfered with proper operation of the circuitry.

The circuit of the present invention, on the other hand, is completely digital and requires no adjustments or critical parts and is not bothered by narrow noise pulses which are of a shorter duration than one-half cycle of the internally generated high frequency clock signal.

The present inventive concept uses a high frequency clock source to actuate a counter. The counter divides the high frequency clock by a prescribed amount so that a clock output is obtained of approximately the same duration as incoming data pulses. Whenever a logic 1 data signal is received, a reset pulse is applied to the counter to reset the counter to an initial condition. If the counter is already synchronized, nothing happens upon receipt of the reset pulse since the counter is already in this condition. However, if there is a deviation or non-synchronization in relation to the clock and the data, the counter is reset to initialize at a different time in relation to the actuating high frequency clock. Thus, the output or data clock is again placed in synchronism with the incoming data.

It is thus an object of my invention to provide an improved carrier clock recovery circuit.

Figure 1:
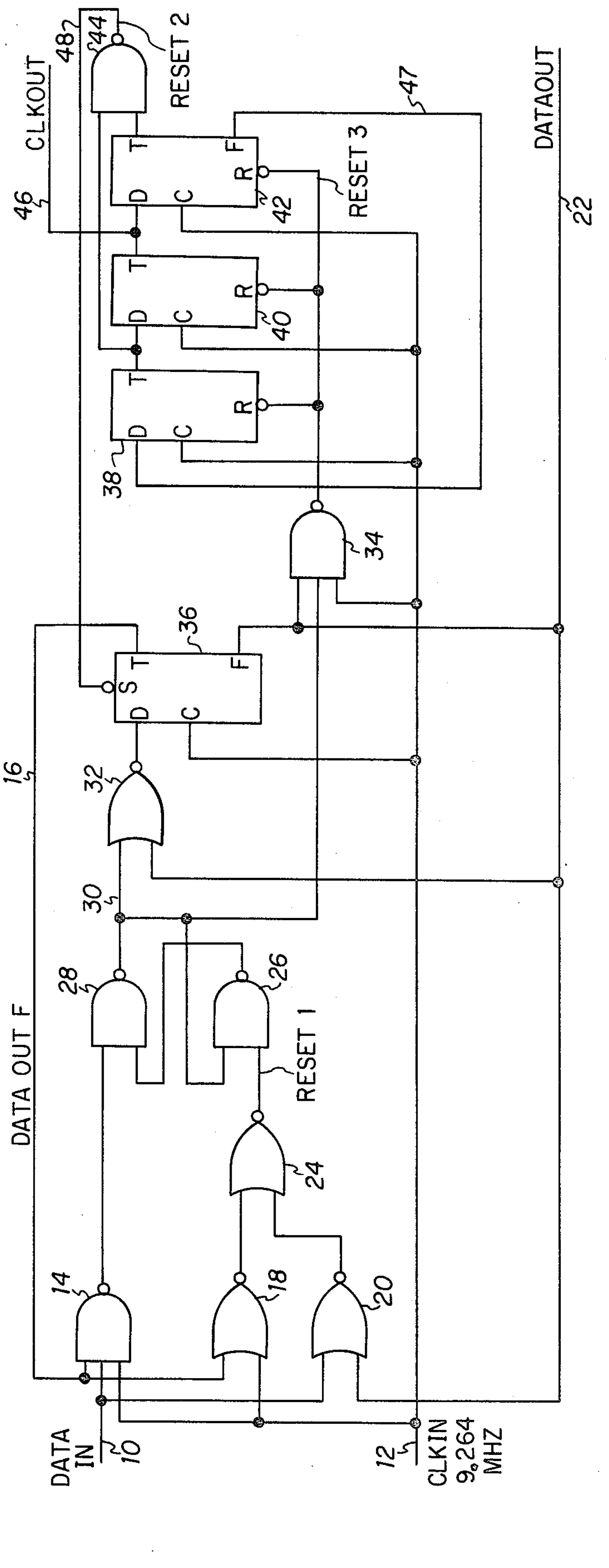
Figure 2:
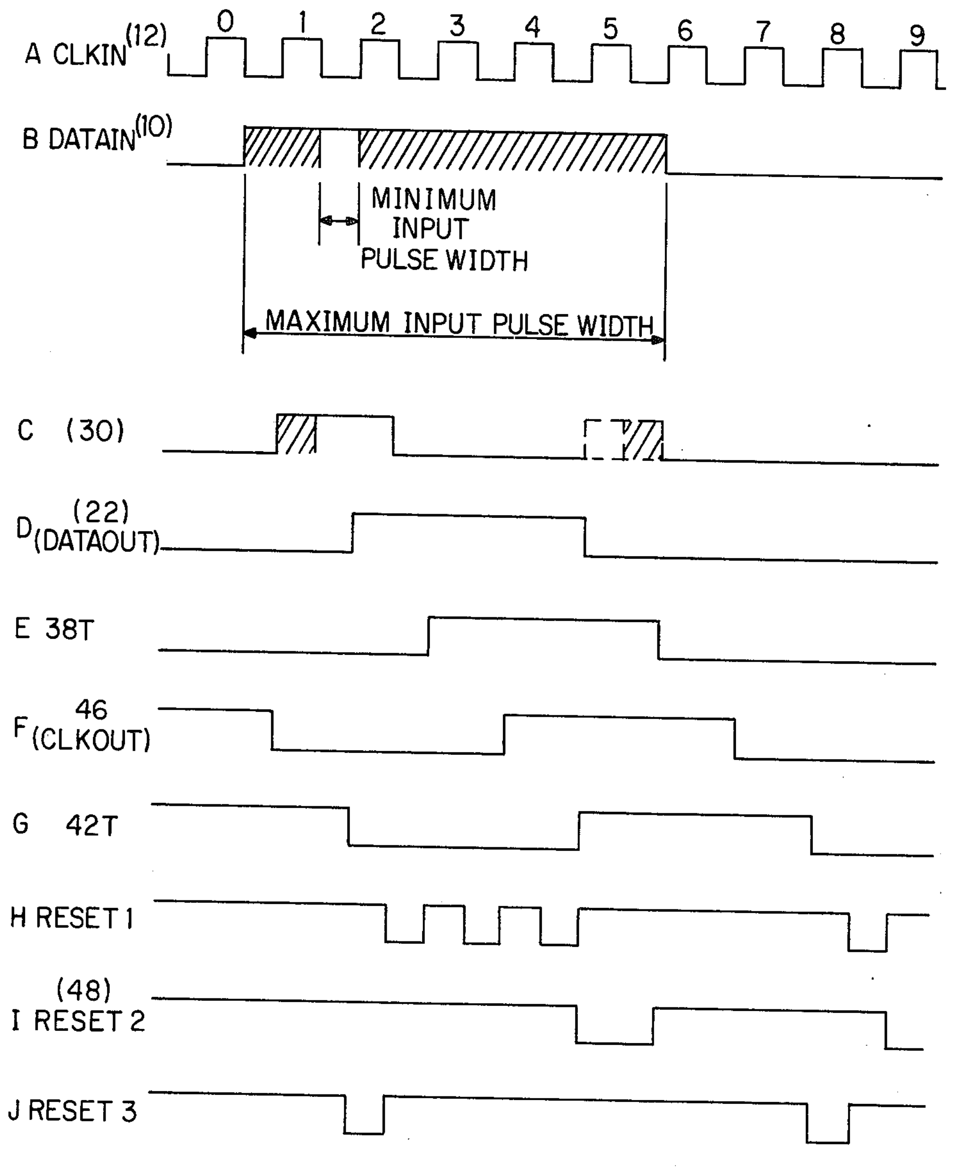

Other objects and advantages of the present invention may be ascertained from a reading of the specification and appended claims in conjunction with the drawings wherein:

FIG. 1 is a schematic diagram of a preferred embodiment of the present inventive concept; and FIG. 2 provides a plurality of waveforms for use in understanding the operation of the circuit of FIG. 1.

In FIG. 1 an input line 10 is used to provide RZ (return to zero) input data. In the embodiment illustrated, the input data representing a logic 1 condition remains at a high level nominally for half the data period. During the remaining times, the lead 10 stays at a low voltage or logic zero level. A high frequency internal clock is supplied on a lead 12. In one embodiment of the invention this clock had a frequency of 9.264 MHZ. As illustrated both leads 10 and 12 provide inputs to a NAND gate 14 which also receives an input on a lead 16. A NOR gate 18 receives an additional input from lead 16 and a signal from input 12. A further NOR gate 20 receives an input from data input lead 10 and from a lead 22 which provides a data output signal to a utilization device. The outputs of the NOR gates 18 and 20 are provided as the input to a NOR gate 24 whose output is supplied as reset No. 1 to a reset input of a flip-flop comprising NAND gates 26 and 28. As shown the outputs of NAND gates 26 and 28 are used as inputs to the other. Additionally, NAND gate 28 receives an input from the output of NAND gate 14. As illustrated, a logic zero received by NAND gate 26 from NOR gate 24 will cause an output lead 30 of NAND gate 28 to go to logic zero. On the other hand, a logic zero provided NAND gate 28 by NAND gate 14 will change lead 30 to a logic 1. The lead 30 is provided to a NOR gate 32 as well as to a NAND gate 34. An output of NOR gate 32 is supplied to a D input of a D flip-flop 36. This D flip-flop as well as other D flip-flops in the circuit may be of the type given a manufacturers part number 7474 and sold by various manufacturers under this number. The T or true output of D flip-flop 36 is connected to lead 16 while the clock input is connected to lead 12. An F output is connected to lead 22 and also connected to a further input of NAND gate 34. An output of NAND gate 34 is connected to the reset input of a plurality of D flip-flops 38, 40 and 42. Each of these flip-flops has the clock inputs connected to lead 12. The F output of flip-flop 42 is connected to the D input of flip-flop 38 by lead 47 while the true (T) output of flip-flop 38 is connected to the D input of flip-flop 40 as well as to a first input of a NAND gate 44. The T output of flip-flop 40 is connected to the D input of flip-flop 42 as well as to a low frequency clock or data clock output 46. The T output of flip-flop 42 is connected to provide a second input to NAND gate 44. An output of NAND gate 44 is supplied on a lead 48, to a set input of flip-flop 36.

Referring to FIG. 2 it will be noted that most of the waveforms have a number in parenthesis to illustrate the point in FIG. 1 from which the waveforms were obtained. Most of these are self-explanatory. Waveform E is obtained from the T output of flip-flop 38. Waveforms H and J are reset waveforms obtained from the points illustrated in FIG. 1. As will be noted, the internal clock is waveform A while the output clock which is to be used by the load with the data is the signal appearing on waveform F. Whenever resynchronization occurs during transmission of data, the output clock will change commencement by a time duration equal to one full cycle of waveform A. Such changes will occur since the frequency of the source clock and the local clock will be different in most instances. Thus, occasionally, the phase differential will become great enough to require a one-sixth cycle adjustment of the output clock signal. As will be realized, the local clock is nominally six times the frequency of the output or data clock.

OPERATION

When a logic 1 signal from input lead 10 is applied to NAND gate 14, a logic 1 should already be present on lead 16 indicating that there is no DATAOUT on lead 22. Upon the next occurrence of the positive portion of a clock signal on lead 12, the NAND gate 14 will provide a logic zero output. The logic zero output will set the flip-flop formed by NAND gate 26 and NAND gate 28 to provide a logic 1 output on lead 30. Thus, two of the leads to NAND gate 34 are logic 1 although lead 22 is still logic zero. The appearance of a logic 1 on lead 30 changes the output of NOR gate 32 to a logic zero. Thus, upon the next positive going clock, the flip-flop 36 will change the output so that lead 16 is logic zero and lead 22 is logic 1. This is illustrated in waveform D. As will be noted, in order for waveform D to appear as shown, the logic signal appearing on lead 10 must become true sometime after the falling edge of the waveform A-O and before the falling edge of waveform A-1. Since NAND gate 14 cannot operate until the clock 12 is at a logic 1 level, the NAND gate 28 cannot produce the logic 1 output illustrated as C until the beginning of the logic 1 portion of waveform A-1.

When lead 22 becomes a logic 1, all the inputs in NAND gate 34 are logic 1 and thus it produces a logic zero output to reset each of the flip-flops 38, 40 and 42. Reset 3 waveform is illustrated in line J of FIG. 2. Thus, the counter comprising flip-flops 38, 40 and 42 is initialized and commences counting whereby a clock pulse is provided on lead 46 on the second full clock pulse after initialization. On the third full high frequency clock pulse on lead 12 after initialization, a logic zero appears on lead 48 to set flip-flop 36 whereby a logic 1 again appears on lead 16. This action additionally produces a logic zero output on lead 22.

On the third clock pulse on lead 12 after initialization, a logic zero output on lead 47 is applied to the D input of flip-flop 38. Thus, flip-flop 38 is in a condition whereby the next clock pulse will continue the counting action of the counter.

Returning to the occurrence of a logic 1 appearing on lead 22, it will be noted that a logic zero is supplied on lead 16 to the upper input of NOR gate 18. On the next negative half cycle of the high frequency clock, a logic 1 will appear at the output of NOR gate 18. This logic 1 will produce a logic zero output from NOR gate 24 to reset the NAND gate flip-flop using NAND gates 26 and 28. Thus, the waveform as illustrated in waveform H is produced during the time that the data outlead 22 is a logic 1.

Returning to FIG. 2B, it will be noted that if the input data waveform is less than one-half cycle of the high frequency input clock, it cannot provide an output to the D input of flip-flop 36 or if it does present such an input will not maintain it until the next positive going clock is supplied. Thus, no output is provided on lead 22. Since the DATAIN signal on lead 10 is modulated as RZ data it must return to zero prior to the leading edge of the sixth clock pulse as shown in FIG. 2A. If the DATAIN signal doesn't return to zero prior to the leading edge of clock pulse 6 the circuit will interpret the following data bit to be a logic 1 and the clock phase of the clock out signal will be adjusted accordingly (i.e., erroneous circuit operation will result).

If the DATAIN signal of line B becomes a logic 1 value prior to the negative or falling edge of waveform A-pulse O, then the lead 30 would be set to a logic 1 during pulse A-O. Therefore, the output lead 22 would rise to a logic 1 during pulse A-1 rather than pulse A-2 as shown. Therefore, the output clock on lead 46 would occur one clock pulse of waveform A sooner than that illustrated in FIG. 2. This would cause the reset pulse from the output of NAND gate 34 to reset the clock to its initial condition one pulse sooner than that illustrated in FIG. 2.

Conversely, if the DATAIN signal of line B becomes a logic 1 after the trailing edge of pulse A-1, then the DATAOUT and reset 3 signals will be delayed one high frequency clock time and the counter will be reset during pulse A-3 or in other words will be initialized one high frequency clock pulse later than it had as illustrated in FIG. 2.

If the input on lead 10 remains at a logic zero level, the counter will continue counting without being reset and the output on lead 22 will remain at a logic zero. However, the clock on lead 46 will maintain the phase which was set by the last logic 1 input signal on lead 10.

As will be noted, the phase of the output clock on 46 can be set to any one of 6 possible phases relative to the high frequency input clock on lead 12.

While I have illustrated one possible and preferred embodiment of the present invention concept, it is to be realized that other implementations may be produced and I wish to be limited not by the specific circuit shown but only by the scope of the appended claims wherein

I claim:

1. Apparatus for recovering a clock signal from received data comprising, in combination:
- data means for supplying input data signals;
- high frequency clock means for supplying high frequency clock signals having continuously alternating logic 1 and logic zero values;
- first flip-flop means including input and output means;
- second flip-flop means including clock, input and output means;
- first logic means connected to said data means, said clock means, said output means of said second flip-flop means and to said first flop means for setting said first flip-flop in response to a first predetermined set of input signals from said data means, said clock means and said output means of second flip-flop means and for resetting said first flip-flop means in response to a second predetermined set of input signals;
- counter means, including clock input and clock output means for providing a data clock output signal at a divided and lower frequency than the input;
- means connecting the high frequency clock means to said clock input means of said counter means;
- second logic means, connected between said counter means and said second flip-flop means for setting said second flip-flop at a predetermined count;
- third logic means connected to said first and said second flip-flop means for actuating said second flip-flop means in response to a third predetermined set of input signal conditions;
- fourth logic means, connected to said counter means, said clock means, said first flip-flop means and said second flip-flop means, for initializing said counter in response to a fourth predetermined set of input conditions; and
- data signal output means connected to said output means of said second flip-flop means.

2. Apparatus as claimed in claim 1 wherein:
- said first logic means comprises a NAND gate and three NOR gates;
- said second and fourth logic means each comprises a NAND gate; and
- said third logic means comprises a NOR gate.

3. The method of producing a clock having the proper phase relationship with respect to a received data signal, comprising the steps of:
- generating a high frequency clock signal;
- counting the high frequency clock signal for dividing it to a lower frequency signal;
- generating a logic first signal upon the simultaneous occurrence of a high frequency clock of a given first logic value and a given second logic value of an incoming data signal occurring after a minimum period of time of not receiving a data signal of the second logic value;

generating a logic 1 output data signal upon the next occurrence of a high frequency clock of the given first logic value only if the incoming data signal has remained at the second logic value;

setting the counting means to an initial condition after the generation of an output data signal; and, returning the logic 1 output data signal to a logic zero at a predetermined count of the means for counting the high frequency clock signal.

4. Apparatus for producing a clock signal having the proper phase relationship with respect to a received data signal comprising, in combination:

means for generating a high frequency clock signal;

means for counting the high frequency clock signal whereby it is divided to a lower frequency clock signal;

means for generating a logic 1 first signal upon the simultaneous occurrence of a high frequency clock signal of a given first logic value and of an incoming data signal occurring after a minimum period of time of not receiving a data signal value of the second logic value;

means for generating a logic 1 output data signal upon the next occurrence of the high frequency clock having the given first logic value only if the incoming data signal has remained at the second logic value;

means for setting the counting means to an initial condition after the generation of an output data signal of the logic 1 value; and means for returning the logic 1 value output data signal to a logic zero at a predetermined count of the means for counting the high frequency clock signal.

* * * * *